United States Patent
Jung et al.

(10) Patent No.: US 7,840,739 B2
(45) Date of Patent: Nov. 23, 2010

(54) UPNP CONTROL POINT AND METHOD OF HANDLING UPNP CONTROL REQUEST

(75) Inventors: Dong-shin Jung, Suwon-si (KR); Kiran Bharadwaj Vedula, Karnataka (IN); Subramanian Krishnamoorthy, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 12/143,900

(22) Filed: Jun. 23, 2008

(65) Prior Publication Data

US 2009/0018677 A1 Jan. 15, 2009

Related U.S. Application Data

(60) Provisional application No. 60/945,620, filed on Jun. 22, 2007.

(30) Foreign Application Priority Data

Jun. 3, 2008 (KR) ...................... 10-2008-0052254

(51) Int. Cl.
*G06F 13/00* (2006.01)

(52) U.S. Cl. ...................... 710/302; 710/310

(58) Field of Classification Search ................... 710/52, 710/302, 310; 700/90
See application file for complete search history.

(56) References Cited

U.S. PATENT DOCUMENTS

| | | | |
|---|---|---|---|
| 2005/0102369 A1* | 5/2005 | Kim et al. | 709/213 |
| 2006/0031459 A1* | 2/2006 | Ahn et al. | 709/224 |
| 2006/0059003 A1* | 3/2006 | Requena et al. | 705/1 |
| 2006/0230130 A1* | 10/2006 | Cho et al. | 709/223 |
| 2007/0086463 A1* | 4/2007 | Ko et al. | 370/392 |
| 2007/0211632 A1* | 9/2007 | Song et al. | 370/230 |

* cited by examiner

*Primary Examiner*—Glenn A Auve
(74) *Attorney, Agent, or Firm*—Sughrue Mion, PLLC (57) ABSTRACT

Provided is a technique for preventing a loss by storing a universal plug and play (UPnP) control request and delaying handling of the UPnP control request. A method of handling a UPnP control request in a UPnP control point includes storing a UPnP control request that is not handled in the UPnP control point, receiving a message informing that a UPnP control device has participated in a network from the UPnP control device, receiving information about capability of the UPnP control device from the UPnP control device, determining whether the UPnP control device can perform the UPnP control request that is not handled based on the information about capability of the UPnP control device, and transmitting the UPnP control request to the UPnP control device that is determined to be able to perform the UPnP control request.

15 Claims, 6 Drawing Sheets

FIG. 7 ained UPNP CONTROL POINT AND METHOD OF HANDLING UPNP CONTROL REQUEST

CROSS-REFERENCE TO RELATED PATENT APPLICATION

This application claims the benefit of U.S. Patent Application Ser. No. 60/945,620 filed on Jun. 22, 2007, in the U.S. Patent and Trademark Office, and priority from Korean Patent Application No. 10-2008-0052254, filed on Jun. 3, 2008 in the Korean Intellectual Property Office, the disclosures of which are incorporated herein in their entirety by reference.

BACKGROUND OF THE INVENTION

1. Field of the Invention

Apparatuses and methods consistent with the present invention relate to a home network, and more particularly, to a method of handling a universal plug and play (UPnP) control request in a UPnP control point.

2. Description of the Related Art

Generally, a home network is a private network based on an Internet Protocol (IP), and connects any type of a Personal Computer (PC) used at home and various devices, such as intelligent products and wireless devices to one network, and controls that network via a common virtual computing environment called middleware.

Middleware enables communication between various digital devices by connecting the digital devices in a peer-to-peer method. Examples of middleware include Home AV Interoperability (HAVI), a Universal Plug and Play (UPnP) control device, a Java Intelligent Network Infrastructure (JINI), a Home Wide Web (HWW), etc.

It has become easier to install and establish peripheral devices of a PC after a Plug and Play (PnP) function is added to a current operating system. A UPnP expands such a convenient function to an entire network based on an Internet standard technique, such as a Transmission Control Protocol/Internet Protocol (TCP/IP), a Hypertext Transfer Protocol (HTTP), and an Extensible Markup Language (XML), and enables network devices, such as home appliances, network printers, and Internet gates to perform networking, specifically home networking.

A UPnP network includes a UPnP Control Device (CD), which is connected to and controlled by an IP based home network, and a UPnP Control Point (CP), which controls the UPnP CD. The UPnP CD and the UPnP CP communicate with each other by using a UPnP protocol stack structure including IPs, such as TCP/IP and HTTP, and techniques, such as XML and Simple Object Access Protocol (SOAP). The UPnP CP controls the UPnP CD by transmitting a UPnP control request to the UPnP CD.

However, if the UPnP CD breaks down or leaves a network, the UPnP CP cannot transmit the UPnP control request to the UPnP CD. Accordingly, the UPnP control request is not received, and service cannot be provided to a user.

SUMMARY OF THE INVENTION

The present invention provides a method of handling a universal plug and play (UPnP) control request in a UPnP CP even if a UPnP CD is unavailable, and a UPnP CP performing the method.

The present invention also provides a computer readable recording medium having a program recorded thereon, the program if executed by a computer causes the computer to execute the method.

According to an aspect of the present invention, there is provided a method of handling a UPnP control request in a UPnP CP, the method including: storing a UPnP control request that is not handled in the UPnP CP; receiving a message informing that a UPnP CD has joined a network from the UPnP CD; receiving information about capability of the UPnP CD from the UPnP CD; determining whether the UPnP CD can perform the UPnP control request that is not handled based on the information about capability of the UPnP CD; and transmitting the UPnP control request to the UPnP CD that is determined to be able to perform the UPnP control request.

The method may further include: the UPnP CP joining the network; and searching for a UPnP CD in the network in the UPnP CP.

The method may further include deleting a UPnP control request if a predetermined amount of time has passed after its storage.

The deleting of a UPnP control request may include: searching for a UPnP CD that can perform the UPnP control request; storing the number of failures to find the UPnP CD that can perform the UPnP control request; and deleting the UPnP control request, if the number of failing time is equal to or more than a predetermined number.

According to another aspect of the present invention, there is provided a UPnP CP handling a UPnP control request, the UPnP CP including: a control request storage unit, which stores a UPnP control request that is not handled; a device receiver, which receives a message informing that a UPnP CD joined a network and information about capability of the UPnP CD, from the UPnP CD; a determiner, which determines whether the UPnP CD can perform the UPnP control request that is not handled based on the information about the capability; and a device transmitter, which transmits the UPnP control request if it is determined that the UPnP CD can handle the UPnP control request.

The UPnP CP further includes a device searcher, which searches for a UPnP CD that joined the network.

The UPnP CP further includes a control request deleter, which deletes a UPnP control request if a predetermined amount of time has passed after its storage in the control request storage unit.

The control request deleter may store the number of failures to find a UPnP CD that can handle the UPnP control request, and if the number of failures is equal to or more than a predetermined number, deletes the UPnP control request.

According to another aspect of the present invention, there is provided a method of handling a UPnP control request from a UPnP CP, performed in a UPnP proxy device, the method including: receiving a UPnP control request that is not handled from the UPnP CP and storing the received UPnP control request; receiving a message informing that a UPnP CD joined a network, from the UPnP CD; transmitting the UPnP control request to the UPnP CD; receiving a result of performing the UPnP control request from the UPnP CD; and transmitting the result to the UPnP CP.

According to another aspect of the present invention, there is provided a UPnP proxy device handling a UPnP control request, the UPnP proxy device including: a control request storage unit, which receives a UPnP control request that is not handled from the UPnP CP and stores the received UPnP control request; a device join message receiver, which receives a message informing that a UPnP CD joined a network, from the UPnP CD; a control request transmitter, which transmits the UPnP control request to the UPnP CD; a result receiver, which receives a result of performing the UPnP control request from the UPnP CD; and a result transmitter, which transmits the result to the UPnP CP.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

A UPnP CP and a method of handling a UPnP control request according to the present invention will now be described more fully with reference to the accompanying drawings, in which exemplary embodiments of the invention are shown.

Figure 1:
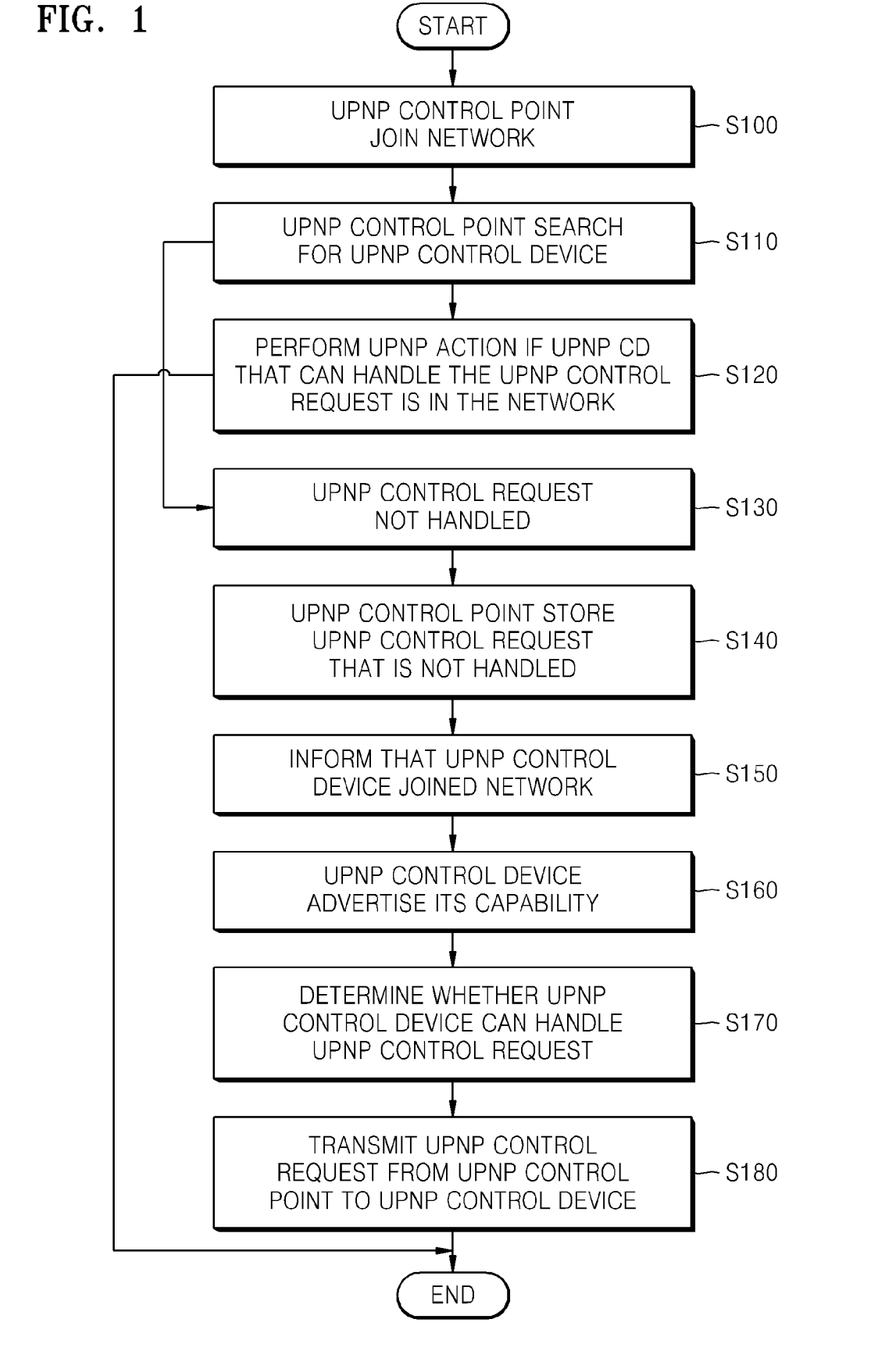
FIG. 1 is a flowchart illustrating a method of handling a UPnP control request according to an exemplary embodiment of the present invention.

FIG. 1 is a flowchart illustrating a method of handling a UPnP control request according to an exemplary embodiment of the present invention.

A UPnP CP according to the present invention may include a control request storage unit, a device receiver, a determiner, a device transmitter, a device searcher, and a control request deleter.

First, the UPnP CP joins a network in operation S100.

The device searcher searches for the UPnP CP that joined the network in operation S110.

If a UPnP CD that can handle the UPnP control request is in the network, a UPnP action is performed in operation S120.

If the UPnP CD breaks down or leaves the network, the UPnP control request cannot be handled in operation S130. In other words, if the UPnP CP could not find a UPnP CD that can handle the UPnP control request, the UPnP CP cannot handle the UPnP control request. Also, the UPnP CP cannot handle any following UPnP control requests until the UPnP CD transmits a advertisement message.

In this case, the UPnP CP stores a UPnP control request that is not handled in the control request storage unit in operation S140.

Afterwards, if the UPnP CD joins the network, the UPnP CD transmits a message informing that the UPnP CD joined the network in operation S150. The device receiver receives the message from the UPnP CD.

The UPnP CD also advertises its capability in operation S160. The device receiver receives information about the capability of the UPnP CD from the UPnP CD.

The determiner determines whether the UPnP CD can handle the UPnP control request that is not handled based on the information about the capacity of the UPnP CD in operation S170.

If the UPnP CD is determined to be able to handle the UPnP control request, the device transmitter transmits the UPnP control request to the UPnP CD in operation S180.

Through the above exemplary embodiments, the present invention provides a delayed handling mechanism. Unlike conventional technology, a case of losing a UPnP control request without being handled is not generated in the delayed handling mechanism. Accordingly, a case where a user is not provided with a desired service is not generated.

Also, if the UPnP CD is a standard device, the UPnP control request can be generated before the UPnP CD is connected to the network. The generated UPnP control request is stored in the control request storage unit, and is handled after the UPnP CD joins the network.

Also, the UPnP CP may further include a control request deleter, which deletes a UPnP control request stored in the control request storage unit if a predetermined amount of time has passed after its storage.

According to an embodiment, the control request deleter may have a timer function. In other words, if a UPnP control request is stored, the stored time may be recorded with the UPnP control request, and a current time and the stored time may be compared regularly. Thus, if a predetermined amount of time has passed after the stored time, the UPnP control request may be deleted. For example, a UPnP control request may be deleted after an hour of its storage.

According to another embodiment, the control request deleter may delete a UPnP control request if the number of times that an error occurred is equal to or more than a predetermined number. For example, the control request deleter may store the number of failures to find a UPnP CD that can handle a UPnP control request, and if the number of failures is equal to or more than a predetermined number, for example 3, the UPnP control request may be deleted.

Figure 2:
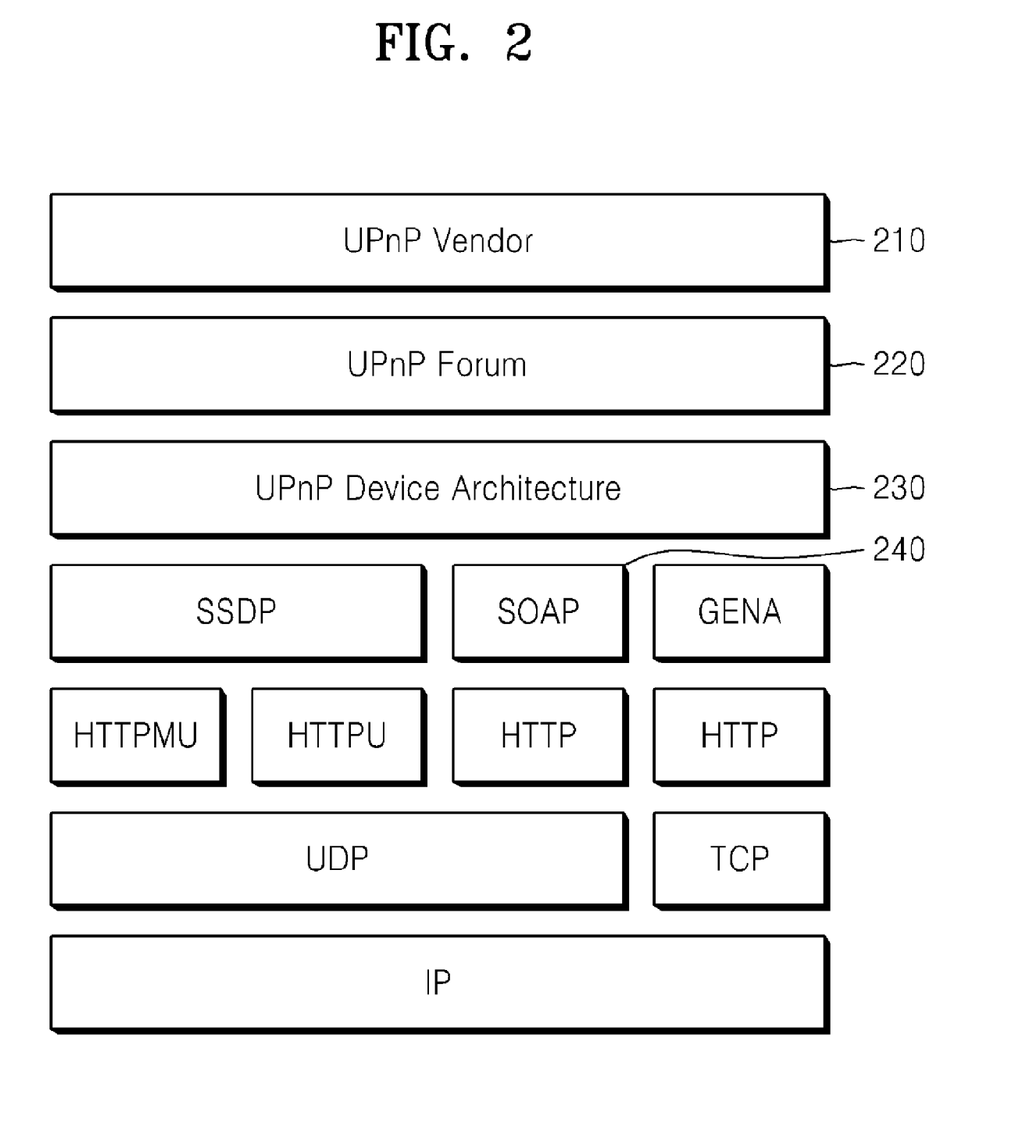
FIG. 2 is a block diagram illustrating a UPnP network infrastructure according to an exemplary embodiment of the present invention.

FIG. 2 is a block diagram illustrating a UPnP network infrastructure according to an exemplary embodiment of the present invention.

A UPnP vendor 210 is a protocol for expanding a function of a UPnP.

A UPnP forum 220 provides a device control protocol (DCP).

A UPnP device architecture 230 is a core of UPnP.

A UPnP CP and a UPnP CD communicate to each other by using a control protocol called a simple object access protocol (SOAP) 240.

Figure 3:
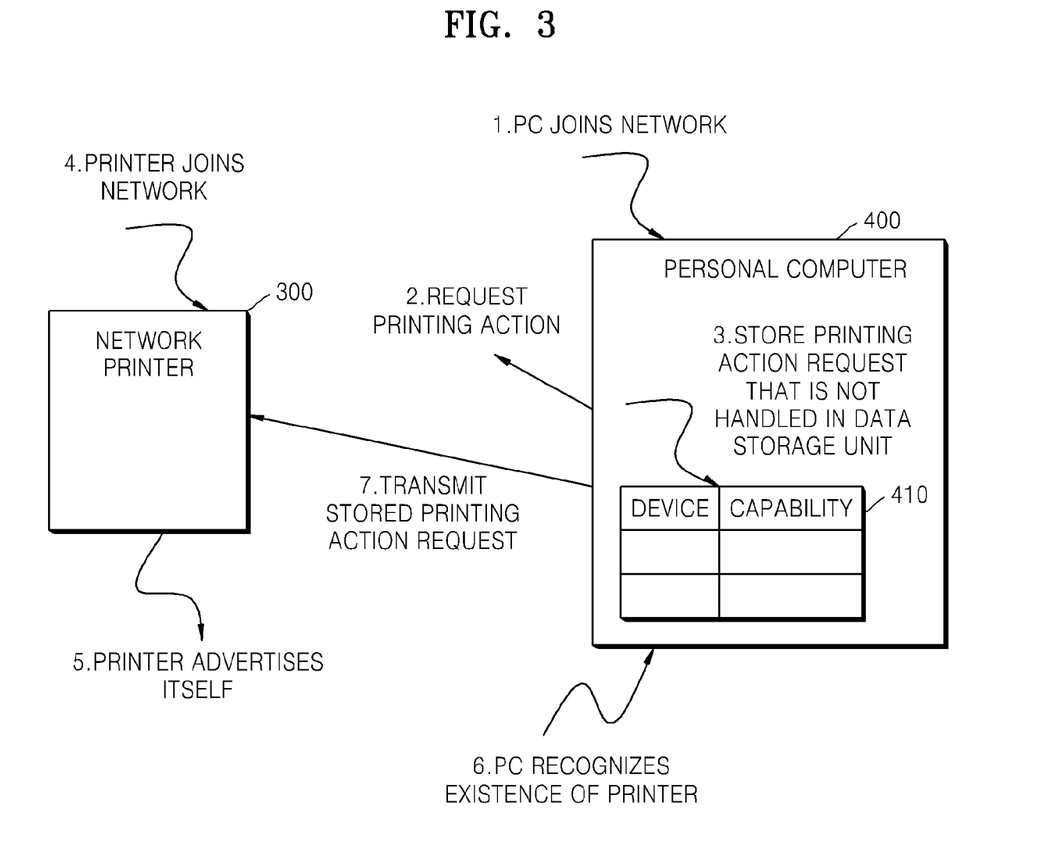
FIG. 3 is a diagram illustrating an example of performing a method of handling a UPnP control request according to an exemplary embodiment of the present invention.

FIG. 3 is a diagram illustrating an example of performing a method of handling a UPnP control request according to an exemplary embodiment of the present invention.

FIG. 3 illustrates processes of transmitting a UPnP control request for performing a printing action from a personal computer (PC) 400 to a network printer 300, and handling the UPnP control request.

The PC 400 operates as a UPnP CP, and the network printer 300 operates as a UPnP CD.

First, the PC 400 joins a network in operation 1.

If a printing action request is received from a user, the PC 400 searches for a printer in the network that can handle the printing action request in operation 2.

If a printer that can handle the printing action request is not found in the network, the printing action request that is not handled is stored in a data storage unit 410 in operation 3.

Referring to FIG. 3, the data storage unit 410 stores a device that can handle the printing action request and required capability.

If the network printer 300 joins the network in operation 4, the network printer 300 transmits a message informing its capacity, and that it joined the network to devices in the network in operation 5. Such a message is called advertisement.

Upon receiving the advertisement, the PC 400 recognizes the existence of the network printer 300 in operation 6, and transmits the printing action request to the network printer 300 in operation 7.

Figure 4:
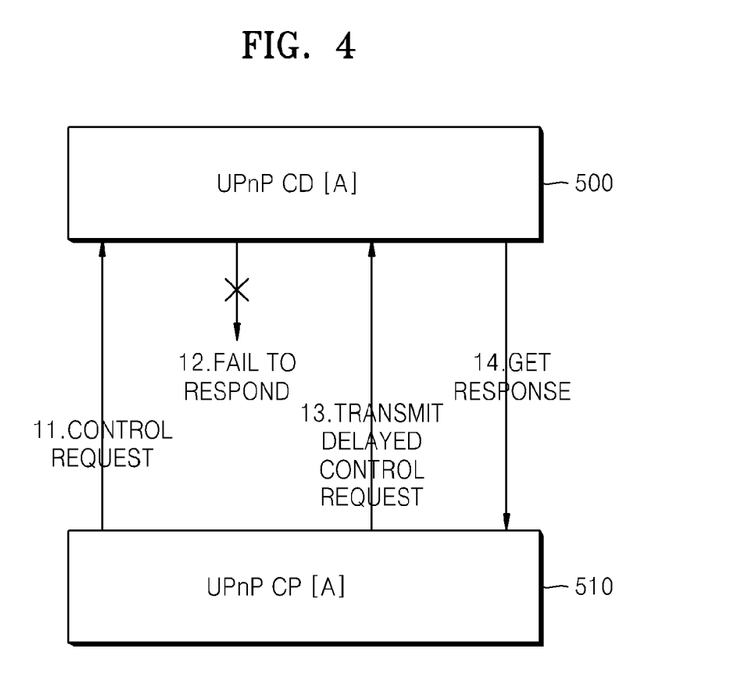
FIG. 4 is a diagram illustrating a method of handling a UPnP control request according to an exemplary embodiment of the present invention.

FIG. 4 is a diagram illustrating a method of handling a UPnP control request according to an exemplary embodiment of the present invention. In FIG. 4, a method of requesting a delay to a UPnP CD 500 and receiving a result of request is illustrated.

First, a UPnP CP 510 transmits a control request to the UPnP CD [A] 500 in operation 11. If the UPnP CD [A] 500 is broken down or seceded from a network, the UPnP CD [A] 500 cannot respond to the control request in operation 12.

If the control request is not handled by the UPnP CD [A] 500, i.e. if the control request is delayed, or if a preserved action request is prepared, the UPnP CP [A] 510 stores the control request.

Next, the control request is re-transmitted in operation 13 if the UPnP CD [A] 500 is available. The result of performing an action by the UPnP CD [A] 500 is provided to the UPnP CP [A] 510 in operation 14.

Figure 5:
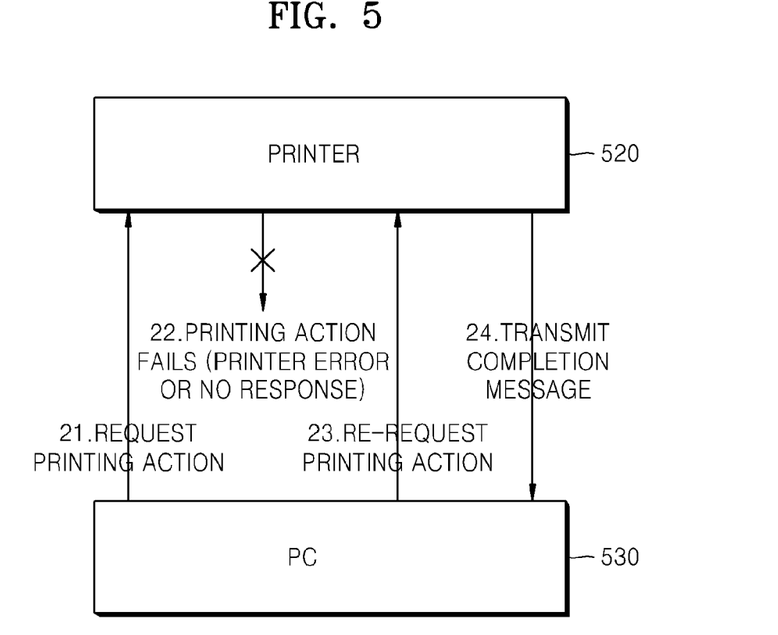
FIG. 5 is a diagram illustrating an example of applying the method of FIG. 4.

FIG. 5 is a diagram illustrating an example of applying the method of FIG. 4. In FIG. 5, a PC 530 operates as the UPnP CP [A] 510 and a printer 520 [A] operates as the UPnP CD [A] 500.

First, the PC 530 requests a printing action to the printer 520 in operation 21. However, if the printer 520 has an error or does not respond, the printing action fails in operation 22. An error occurs if the PC 530 and the printer 520 cannot communicate with each other or if the printer 520 has a problem.

A failed UPnP control request, i.e., the printing action, is stored in the PC 530. Then, in operation 23 if a predetermined amount of time passes or if the printer 520 joins the network, the printing action is requested to the printer 520. After the printing action is performed, the printer 520 transmits a completion message to the PC 530 in operation 24.

In the above exemplary embodiments, a UPnP CP directly transmits a preserved action request to a UPnP CD. Also, a result of delayed action is directly transmitted from the UPnP CD to the UPnP CP. Accordingly, even if the UPnP CD is not in a network, an action request is previously prepared, and can be requested if the UPnP CD is available. In other words, preserved control is possible. Also, an action that did not receive an action response can be re-requested (delayed control).

However, in order to receive a result of an action, the UPnP CP may exist in the network if the UPnP CD is available.

Accordingly in the present invention, a proxy-based method of handling a UPnP control request is provided.

Figure 6:
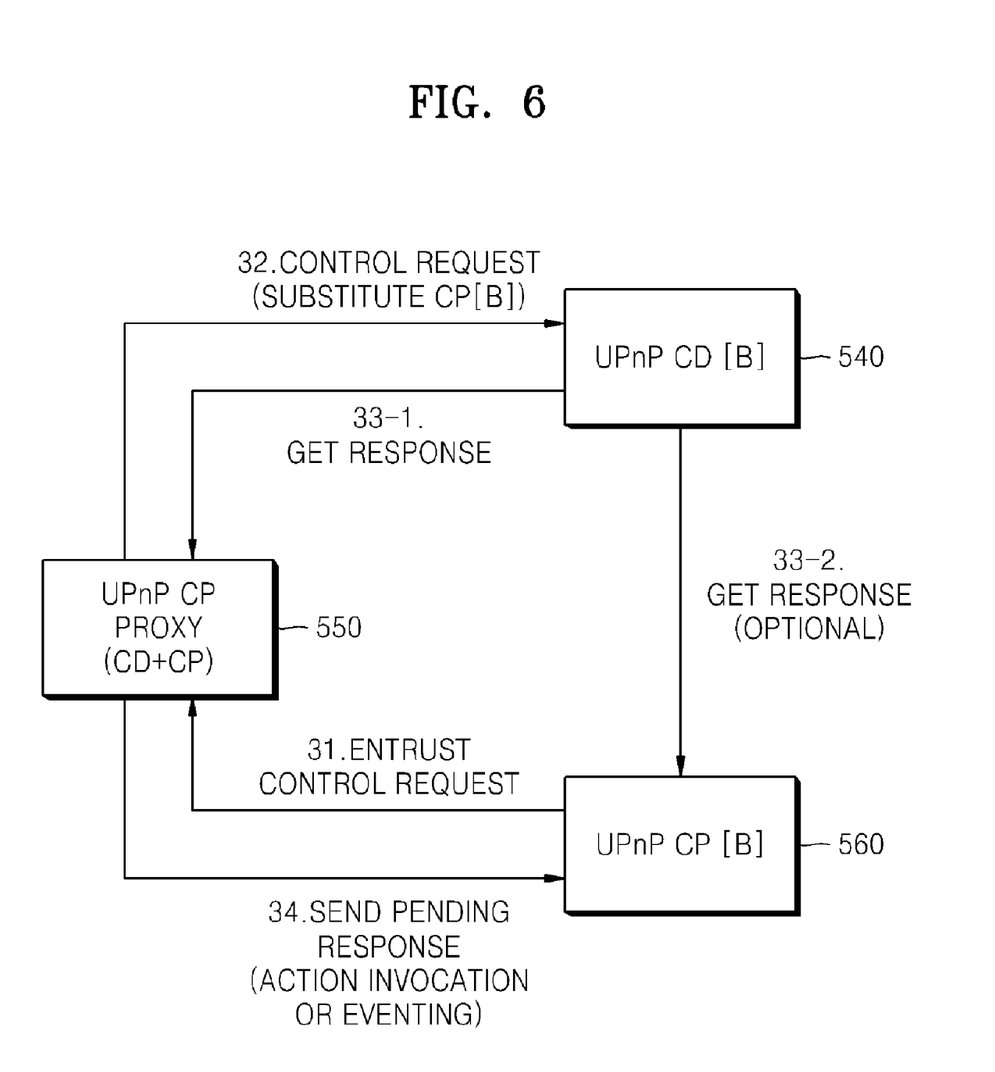
FIG. 6 is a diagram illustrating a method of handling a UPnP control request according to an exemplary embodiment of the present invention.

FIG. 6 is a diagram illustrating a method of handling a UPnP control request according to an exemplary embodiment of the present invention.

A UPnP CP proxy 550 is a device that receives UPnP control requests from a UPnP CP [B] 560 and carries out the UPnP control requests as proxy.

Instead of directly transmitting a UPnP control request to a UPnP CD [B] 540, the UPnP CP [B] 560 transmits the UPnP control request to the UPnP CP proxy 550. This is called delegation of a UPnP control request (operation 31).

If the UPnP CD [B] 540 is available or predetermined conditions match, the UPnP CP proxy 550 transmits the UPnP control request to the UPnP CD [B] 540 instead of the UPnP CP [B] 560 in operation 32.

The UPnP CD 540 transmits a result of performing the UPnP control request, i.e. a response of the UPnP CD 540, to the UPnP CP proxy 550 in operation 33-1, and the UPnP CP proxy 550 transmits the result to the UPnP CP 560 in operation 34.

The UPnP CP proxy 550 transmits a UPnP response, i.e. the result of performing the UPnP control request, to the UPnP CP 560 if the UPnP CP 560 calls an action requesting to transmit the result to the UPnP CP proxy 550. Alternatively, the UPnP CP 560 asynchronously receives the result as a UPnP event by subscribing a status variable on the result.

In operation 33-2, the UPnP CD 540 may directly transmit the result to the UPnP CP 560. Operation 33-2 can be performed if a UPnP device architecture (UDA) specification can be changed, since the UPnP CD 540 transmits the result to the UPnP CP 560, instead of the UPnP CP proxy 550 that transmitted the UPnP control request.

Figure 7:
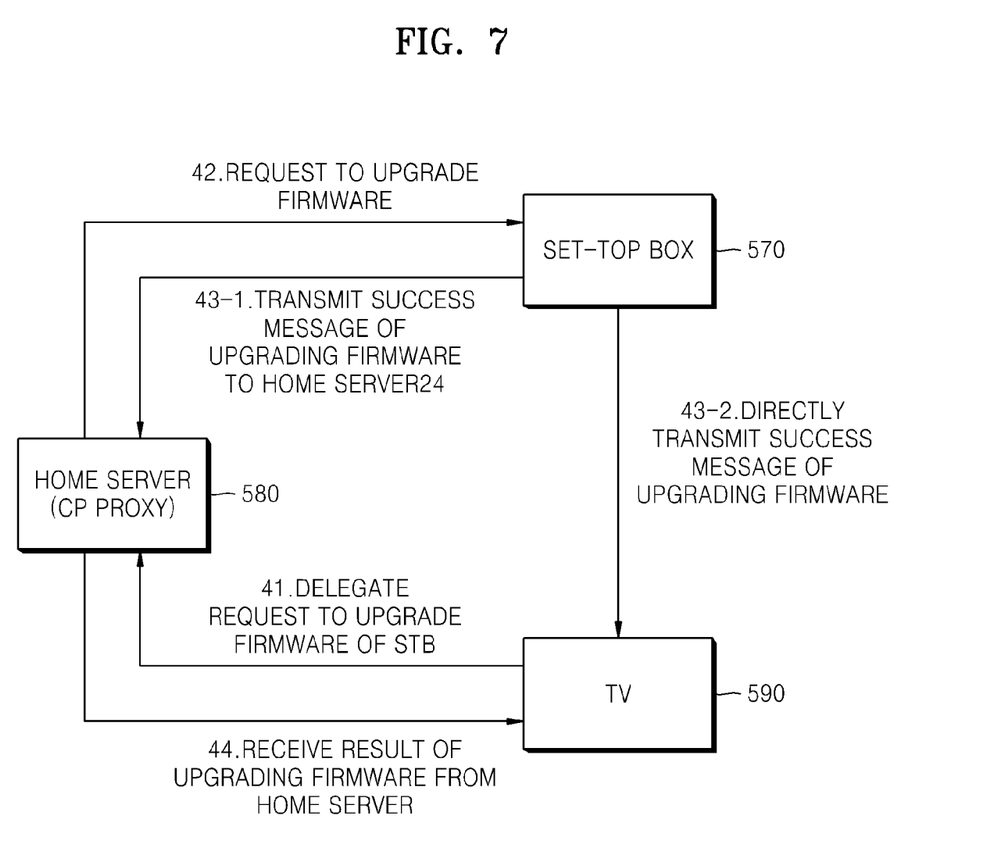
FIG. 7 is a diagram illustrating an example of applying the method of FIG. 6 to a home network.

FIG. 7 is a diagram illustrating an example of applying the method of FIG. 6 to a home network. In FIG. 7, a home server 580 performs functions of the UPnP CP proxy 550.

A TV 590 includes application that manages all versions of firmware in the home network. However, it is not guaranteed that the TV 590 is always turned on, and thus it can be requested to upgrade firmware of a certain device or to transmit a result as proxy via the home server 580. Accordingly, the TV 590 requests the home server 580 to upgrade firmware of a set-top box (STB) 570 as proxy in operation 41.

The home server 580 periodically checks the status of the STB 570. If the STB 570 is available, the home server 580 requests the STB 570 to perform a firmware upgrade action in operation 42.

If the firmware upgrade action succeeds, the STB 570 transmits a firmware upgrade success message to the home server 580 in operation 43-1. If the firmware upgrade action fails, an error message is transmitted as a response, and the home server 580 may re-request to upgrade the firmware or transmit the failure result to the TV 590 if the TV 590 is turned on.

In operation 44, the home server 580 provides the result of upgrading the firmware to the TV 590. Operation 44 is performed if the TV 590 calls an action of the home server 580. Alternatively, the TV 590 can receive the result as a form of an event from the home server 580.

Also, the STB 570 may directly transmit a message about the result of upgrading the firmware to the TV 590 in operation 43-2. As described above, a UDA specification needs to be changed since an object (home server 580) that requested the firmware upgrade action and an object (TV 590) that receives an action response are different. As such, in the proxy-based preserved/delayed action control according to the present invention, it is possible to perform an action request as proxy based on a CP proxy and receive a result of the action request. A CP proxy substitutionally requests a predetermined action to a CD instead of CPs, and the CD transmits the result of the predetermined action to the CP proxy. A method of a CP proxy forwarding a result to a CP may vary. In other words, the CP may call an action to the CP proxy to transmit the result, or the CP may asynchronously receive the result as a UPnP event by subscribing a status variable about the result.

Accordingly, a result of a delayed action can be transmitted to the CP directly or via the CP proxy, and thus restrictions in a method of handling a UPnP control request in the related art can be overcome.

According to a proxy-based method of handling a UPnP control request of the present invention, if a CD is not in a network, an action is previously prepared so that the action is requested if the CD is available. thus, not only delayed control is possible regarding an action that did not get an action response, but also the UPnP CP does not need to be in the network so as to perform a delayed action. These characteristics are useful if the UPnP CP needs to receive a result about performing a predetermined action. Therefore, it is possible to reserve a printing operation or a firmware upgrading operation.

According to the UPnP CP and the method of handling a UPnP control request of the present invention, a UPnP control request that is not handled is stored in a control request storage unit, and then is handled if a UPnP CD that can handle the stored UPnP control request joins a network. Accordingly, all UPnP control requests that a user wants can be handled, and thus a sufficient service can be provided to the user.

Also according to the UPnP proxy-based method of handling a UPnP control request, it is possible to transmit a UPnP control request or receive the result of performing the UPnP control request to a UPnP CD even if a UPnP CP does not exist in a network.

The invention may also be embodied as computer readable codes on a computer (including all apparatuses having an information processing function) readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of handling a universal plug and play (UPnP) control request in a UPnP control point (CP), the method comprising:
storing a UPnP control request, that is not handled, in the UPnP control point; receiving a message from a UPnP control device (CD) that the UPnP CD has joined a network; receiving capability information of the UPnP CD from the UPnP CD; determining whether the UPnP CD may perform the UPnP control request based on the capability information; and transmitting the UPnP control request to the UPnP control device which is able to perform the UPnP control request.

2. The method of claim 1, further comprising:
the UPnP CP joining the network; and
searching for the UPnP CD in the network.

3. The method of claim 1, further comprising deleting the UPnP control request if a predetermined amount of time has passed after the storage of the UPnP control request.

4. The method of claim 3, wherein the deleting of the UPnP control request comprises:
searching for the UPnP CD that may perform the UPnP control request;
storing a number of times a occurred to find the UPnP CD that may perform the UPnP control request; and
deleting the UPnP control request if the number of times the failure occurred is equal to or more than a predetermined number.

5. A UPnP control point (CP) handling a UPnP control request, the UPnP CP comprising:
a control request storage unit which stores the UPnP control request that is not handled;
a device receiver which receives a message and capability information of a UPnP control device (CD) from the UPnP CD, the message comprising information that the UPnP CD joined a network;
a determiner which determines whether the UPnP CD may perform the UPnP control request based on the capability information; and
a device transmitter which transmits the UPnP control request if the UPnP CD may handle the UPnP control request.

6. The UPnP CP of claim 5, further comprising a device searcher which searches for a UPnP CD which joined the network.

7. The UPnP CP of claim 5, further comprising a control request deleter which deletes the UPnP control request if a predetermined amount of time has passed after the storage of the UPnP control request in the control request storage unit.

8. The UPnP CP of claim 7, wherein the control request deleter stores a number of failures to find a UPnP CD that may handle the UPnP control request, and deletes the UPnP control request if the number of failures is equal to or more than a predetermined number.

9. A computer readable recording medium having a program recorded thereon, the program if executed by a computer causes the computer to execute a method of handling a UPnP control request in a UPnP control point (CP), the method comprising:
storing the UPnP control request, that is not handled, in the UPnP control point;
receiving a message from a UPnP control device (CD) that the UPnP CD has joined a network; receiving capability information of the UPnP CD from the UPnP CD;
determining whether the UPnP CD may perform the UPnP control request based on the capability information; and
transmitting the UPnP control request to the UPnP CD which is determined to be able to perform the UPnP control request.

10. A method of handling a UPnP control request from a UPnP control point (CP) performed in a UPnP proxy device, the method comprising:
receiving a UPnP control request from the UPnP CP and storing the UPnP control request;
receiving a message from a UPnP control device (CD) that the UPnP CD joined a network;
transmitting the UPnP control request to the UPnP CD;
receiving a result of performing the UPnP control request from the UPnP CD; and
transmitting the result to the UPnP CP.

11. The method of claim 10, wherein the UPnP control request is not handled.

12. A UPnP proxy device handling a UPnP control request, the UPnP proxy device comprising:

a control request storage unit which receives the UPnP control request from a UPnP control point (CP) and stores the UPnP control request;

a device join message receiver which receives a message from a UPnP control device (CD) that the UPnP CD joined a network;

a control request transmitter which transmits the UPnP control request to the UPnP CD;

a result receiver which receives a result of performing the UPnP control request from the UPnP CD; and a result transmitter which transmits the result to the UPnP CP.

13. The UPnP proxy device of claim 12, wherein the UPnP control request is not handled.

14. A computer readable recording medium having a program recorded thereon, the program if executed by a computer causes the computer to execute the method of handling a UPnP control request from a UPnP control point (CP) performed in a UPnP proxy device, the method comprising:

receiving the UPnP control request from the UPnP CP and storing the UPnP control request;

receiving a message from a UPnP control device (CD) that the UPnP CD joined a network;

transmitting the UPnP control request to the UPnP CD;

receiving a result of performing the UPnP control request from the UPnP CD; and transmitting the result to the UPnP CP.

15. The computer readable recording medium of claim 14, wherein the UPnP control request is not handled.

* * * * *